United States Patent
Gotoh et al.

(10) Patent No.: US 6,654,438 B1
(45) Date of Patent: Nov. 25, 2003

(54) CONTROL ROD FOR BOILING WATER REACTOR, UNIT FOR CONTROL ROD AND PRODUCTION METHOD OF CONTROL ROD

(75) Inventors: Yasuyuki Gotoh, Hitachinaka (JP); Norio Kawashima, Mito (JP); Akira Koizumi, Hitachi (JP); Yoshiharu Kikuchi, Hitachi (JP)

(73) Assignees: Hitachi, Ltd., Tokyo (JP); Hitachi Engineering Co., Ltd., Ibaraki (JP)

( * ) Notice: Subject to any disclaimer, the term of this patent is extended or adjusted under 35 U.S.C. 154(b) by 0 days.

(21) Appl. No.: 09/916,274

(22) Filed: Jul. 30, 2001

(30) Foreign Application Priority Data

Aug. 30, 2000 (JP) .......................... 2000-261136

(51) Int. Cl.[7] .............................. G21C 7/113
(52) U.S. Cl. .................. 376/327; 376/333; 376/339
(58) Field of Search ................ 376/327, 333, 376/339

(56) References Cited

U.S. PATENT DOCUMENTS

| | | | |
|---|---|---|---|
| 3,332,850 A | | 7/1967 | Johnson et al. ............ 176/86 |
| 3,480,510 A | * | 11/1969 | Anthony ................ 376/219 |
| 4,581,201 A | * | 4/1986 | Haggstrom et al. ....... 376/335 |
| 4,655,999 A | * | 4/1987 | Maruyama et al. |
| 4,752,440 A | * | 6/1988 | Ahlinder et al. .......... 376/333 |
| 4,871,510 A | * | 10/1989 | Aoyama et al. .......... 376/444 |
| 4,874,574 A | * | 10/1989 | Igarashi et al. |
| 4,876,060 A | * | 10/1989 | Yoshioka et al. |
| 5,034,185 A | * | 7/1991 | Ueda et al. |
| 5,075,069 A | * | 12/1991 | Edlund et al. |
| 5,267,286 A | * | 11/1993 | Hirukawa ............... 376/353 |
| 5,422,922 A | * | 6/1995 | Masumi et al. ........... 376/447 |
| 5,719,912 A | * | 2/1998 | Ledford et al. ........... 376/327 |
| 5,883,931 A | * | 3/1999 | Holden et al. |
| 6,028,906 A | * | 2/2000 | Kawashima et al. |
| 6,333,955 B1 | * | 12/2001 | Kawashima et al. |

FOREIGN PATENT DOCUMENTS

| | | | |
|---|---|---|---|
| DE | 3903844 | * 8/1989 | |
| EP | 0 088 945 | 9/1983 | ............ G21C/7/10 |
| EP | 0 331 444 | 9/1989 | ............ G21C/7/10 |
| EP | 0337736 | * 10/1989 | |
| EP | 0 337 736 | 10/1989 | ............ G21C/7/10 |
| JP | 58-168992 | * 10/1983 | |
| JP | 58 168992 | 10/1983 | ............ G21C/7/10 |
| JP | 2-124496 | * 5/1990 | |
| JP | 02124496 | * 5/1990 | |
| JP | 5-2092 | 1/1993 | ............ G21C/7/10 |
| JP | 5-2092 A | * 5/1993 | |
| JP | 05 341078 | 12/1993 | ............ G21C/7/10 |
| JP | 08 105989 | 4/1996 | ............ G21C/7/113 |
| JP | 9-61576 | 3/1997 | ............ G21C/7/10 |
| JP | 9-61576 | * 9/1997 | |
| JP | 11-94975 | * 4/1999 | |

OTHER PUBLICATIONS

Michon, Gerard P., Perimeter of an ellipse [ retrieved May 20, 2002 from <http:/home.att.net/–numericana/answer/answer/ellipse] p. 1.*

Michon, Gerard P., Geometry and topology [retrieved May 20, 2002 from <http:/home.att.net/–nucericana/answer/answer/geometry] p. 4.*

* cited by examiner

Primary Examiner—Michael J. Carone
Assistant Examiner—John Richardson
(74) Attorney, Agent, or Firm—Dickstein Shapiro Morin & Oshinsky LLP

(57) ABSTRACT

A control rod for a BWR according to the present invention comprises a first unit composed of a tie rod, a handle mounted on an axially upper portion of the tie rod and a lower support member or falling speed limiter mounted on a axially lower portion of the tie rod; and a second unit composed of a sheath containing therein reactivity control material, an upper end plate mounted on an axially upper portion of the sheath and a lower end plate mounted on an axially lower portion of the sheath, wherein an upper portion of the upper end plate is fixed to the handle, a lower portion of the lower end plate is fixed to the lower support member or falling speed limiter, whereby the control rod is constructed as a joined body of the first unit and the second unit.

6 Claims, 4 Drawing Sheets

CONTROL ROD FOR BOILING WATER REACTOR, UNIT FOR CONTROL ROD AND PRODUCTION METHOD OF CONTROL ROD

BACKGROUND OF THE INVENTION

The present invention relates to a control rod for controlling output of a BWR (boiling water reactor), a unit for a control rod and a method of producing control rods.

Examples of this kind of control rod for BWR, having blades arranged in an approximately cruciform shape are disclosed in JP A 5-2092 and JP A 9-61576.

Those conventional control rods is each have such a construction in which a handle is mounted on an axially upper portion of a tie rod of approximately cruciform cross-section and a lower support member (or a falling speed limiter, hereunder referred to in the same manner) is mounted on an axially lower portion of the tie rod, an upper hafnium formed in a tube of approximately cruciform cross-section is fixed to the handle and a lower hafnium formed in a tube in the same manner is fixed to the lower support member, further, four sheaths each containing therein the upper and lower hafnium as reactivity control material are fixed to the handle, the lower support member and approximately cruciform end portions of the tie rod.

At this time, any production process of the above-mentioned control rod is not disclosed in the above-mentioned Japanese Laid-open Patent Applications, however, usually the following process is taken.

That is, first, a handle that an upper tongue-shaped portion extending downward and a handle body are formed in one block is mounted on an axially upper portion of a tie rod. A lower support member that a lower tongue-shaped portion extending upward and a lower support member body are formed in one block is fixed to an axially lower portion of the tie rod. Thereby, an assembly (it also is called a frame) of the handle, tie rod and lower support member is completed.

After the upper tongue-shaped portion of the handle is inserted into an upper hafnium elliptic tube from an upper side thereof, the inserted upper tongue-shaped portion and the upper hafnium elliptic tube are connected by a fixing pin passing through both of them. On the other hand, about the lower tongue-shaped portion, also, in the same manner as above it is inserted into an lower hafnium elliptic tube from a downside thereof, and the lower tongue-shaped portion and the lower hafnium elliptic tube are connected by a fixing pin.

As mentioned above, the upper and lower hafnium elliptic tubes are fixed, and then those upper and lower. hafnium elliptic tubes are taken in, in turn, from a U-shaped opening side of a stainless steel sheath of U-shaped cross-section so that all the upper and lower hafnium elliptic tubes are arranged and contained inside the sheath.

After that, an end portion of the sheath U-shaped opening side is welded and fixed to a cruciform end surface corresponding to a tie rod of cruciform cross-section (for example, welded at several positions in the length direction), finally, upper and lower end portions of the sheath are welded and fixed to a lower portion of the handle and to an upper portion of the lower support member.

However, the following subjects exist in the above-mentioned prior arts.

Generally, as for control rods for BWR provided with blades arranged in an approximately cruciform shape, there are a plurality of kinds of control rods according to the specification and performance, etc. of BWRs, and the control rods have different shapes of reactivity control material and fixing structures thereof according to the kinds. In the above-mentioned JP A 5-2092 and JP A 9-61576, the hafnium tube is used as the reactivity control material (neutron absorber), as mentioned above. And, an upper tongue-shaped portion provided in the handle in one block is connected to the upper hafnium tube by a pin and a lower tongue-shaped portion provided in the lower support member in one block is connected to the lower hafnium tube by a pin, whereby the hafnilum tubes are fixed from both upper and lower sides.

On the other hand, as another type of control rod, a construction using a neutron absorbing rod that boron carbide ($B_4C$) is filled in a stainless steel cladding for example is proposed, as disclosed in JP A 11-94975. In this case, any engaging or fixing construction of each neutron absorbing rod and the handle and lower support member sides.is not provided, the each neutron absorbing rod is only mounted on the lower support member by the weight of the rod itself in the sheath.

As the other type of control rod, there is already proposed a construction in which a hafnium solid rod (approximately circular rod shape) is used as reactivity control material, and a convex structure provided at an upper portion of each hafnium rod and a curtain rail-shaped concave structure are engaged thereby to support the hafnium rod in a sheath. In this case, any engaging or fixing structure of each hafnium rod and a lower support member side is not provided.

The control rod using the hafnium tube disclosed in the above-mentioned JP A 5-2092 and JP A 9-61576 is very similar to the control rod using the $B_4C$-containing neutron absorbing rod disclosed in the above-mentioned JP A 11-94975 and the control rod in which hafnium solid rods are engaged with and supported by curtain rail-shaped constructions in a point of a basic construction in which a handle and a lower support member are mounted on upper and lower portions of a tie rod of cruciform cross-section, a sheath containing therein reactivity control material is arranged in a space between the handle and the lower support member, and different therefrom only in a construction on the reactivity control side. Therefore, if the similar constructions can be made into common parts, the common parts can be applied to each of the above-mentioned three kinds of control rods.

However, in the above mentioned JP A 5-2029 and JP A 9-61576, such a point is not considered. That is, when the handle, tie rod and lower support member are assembled in advance as an assembly, the upper tongue-shaped portion that the upper hafnium tube is to be mounted to is already formed at the lower portion of the handle, and the lower tongue-shaped portion that the lower hafnium tube is to be mounted to is already formed at the upper portion of the lower support member. Therefore, it was impossible to apply for the control rod using the above-mentioned $B_4C$-containing neutron absorbing rod and for the control rod engaging and supporting hafnium solid rods, both types of which do not use fixing structures by such tongue-shaped portions.

As a result, irrespective of existence of relatively many parts of similar structure, it is necessary to produce by process and equipment different from the above-mentioned two other types of control rods, whereby the process and production equipment were increased and the production efficiency (productivity) was lowered. Further, since control rods which are not so greatly different from each other were produced, transported and stored for each type, matters increasing disadvantages on transportation and requiring a wide storage space were noticed.

SUMMARY OF THE INVENTION

An object of the present invention is to provide a structure in which parts are made common to a plurality of types and the production process and equipment are reduced whereby the productivity can be improved, in a control rod of a BWR provided with blades arranged in an approximately cruciform shape.

(1) In the present invention, a first unit which is constructed by a tie rod, a handle mounted on an axially upper portion of the tie rod and a lower support member or falling speed limiter mounted on an axially lower portion of the tie rod, and a second unit which is constructed by a sheath containing therein reactivity control material, an upper end plate mounted on an axially upper portion of the sheath and a lower end plate mounted on an axially lower portion of the sheath are provided, an upper portion of the above-mentioned upper end plate is fixed to the above-mentioned handle, a lower portion of the above-mentioned lower end plate is fixed to the above-mentioned lower support member or falling speed limiter, and the present invention is constructed as a joined body of the above-mentioned first unit and the above-mentioned second unit.

In the present invention, a lower portion side region of the handle, on which is reactivity control material is mounted in a conventional construction is separated as the upper end plate to be a separate member, and in the same manner, an upper portion side region of the lower support member (or falling speed limiter, hereunder referred in the same manner) is separated as the lower end plate to be a separate member. The handle of which the lower portion side region is separated and the lower support member of which the upper portion side region is separated are mounted on upper and lower portions of the tie rod, respectively, thereby to make the first unit, while the upper end plate separated from the handle and the lower end plate separated from the lower support plate are mounted on the sheath containing therein reactivity control material, as mentioned above, thereby to make the second unit.

Thereby, for the control rod using the upper hafnium tube and lower hafnium tube, the upper and lower tongue portions are fixed to the upper and lower end plates, respectively, and the upper and lower hafnium tubes are connected to them by pins and covered with the sheath, whereby the second unit for specific use is prepared. As can be seen in FIG. 2, the hafnium tubes and the sheath can be, for example, made of a hollow tube with substantially straight sections having U-shaped end sections at both lateral ends. For the control rod using the neutron absorbing rods containing therein $B_4C$, the neutron absorbing rods are disposed on the lower end plate and covered with the sheath, whereby the second unit for specific use is prepared. For the control rod using hafnium solid rods, the second unit for specific use formed by engaging a curtain rail-shaped concave portion formed at a lower portion of the upper end plate with a convex portion formed at an upper portion of each hafnium rod and covered with the sheath is prepared; whereby the first unit of an assembly of the handle, the lower support member and the tie rod can be commonly used for the above-mentioned three types of control rods (having them in common).

Therefore, the process and equipment can be reduced and the productivity can be improved compared with conventional process and equipment in which different process and equipment were necessary for each type of control rod. Further, for the first units which are made common, it is possible to store in the same place through the same transferring route. And only the second units which are different from each other need to be stored at different places. Therefore, there is also such an effect that the storage spaces can be reduced without suffering from disadvantages on transportation.

(2) In the above-mentioned item (1), preferably, the above-mentioned sheath is made of a hollow tube of substantially straight sections having U-shaped end sections at both lateral ends.

Thereby, it is possible to form a closed space containing therein the reactivity control material by only the sheath, so that it is unnecessary to weld and fix a U-shaped open end of the sheath to a cruciform end surface of a tie rod of cruciform cross-section type, as in a conventional construction. That is, it is possible to omit complicated welding of plural positions in the length direction of the tie rod which is long and several meters in whole length, so that the process can be simplified and the reliability can be raised as well.

(3) In the above items (1) or (2), preferably, the above-mentioned reactivity control material is made of at least one of a hafnium tube of substantially straight sections having U-shaped end sections at both lateral ends, a hafnium rod and a neutron absorbing rod containing boron carbide.

(4) A unit for a control rod according to the present invention comprises a sheath made of an elliptic tube of approximately cruciform cross-section and containing therein reactivity control material, an upper end plate mounted on an axially upper portion of the above-mentioned heath, and a lower end plate mounted on an axially lower portion of the above-mentioned sheath.

(5) A production process of a control rod according to the present invention comprises the steps of mounting a handle on an axially upper portion of a tie rod, and a lower support member or falling speed limiter on an axially lower portion of the tie rod, thereby to form a first unit; mounting an upper end plate on an axially upper portion of a sheath containing therein reactivity control material, and a lower end plate on an axially lower portion of the sheath, thereby to form a second unit; and then fixing an upper portion of the above-mentioned upper end plate to the above-mentioned handle, and a lower portion of the above-mentioned lower end plate to the above-mentioned lower support member or falling speed limiter, thereby to join the above-mentioned first unit and the above-mentioned second unit.

DESCRIPTION OF EMBODIMENTS OF THE INVENTION

Figure 1:
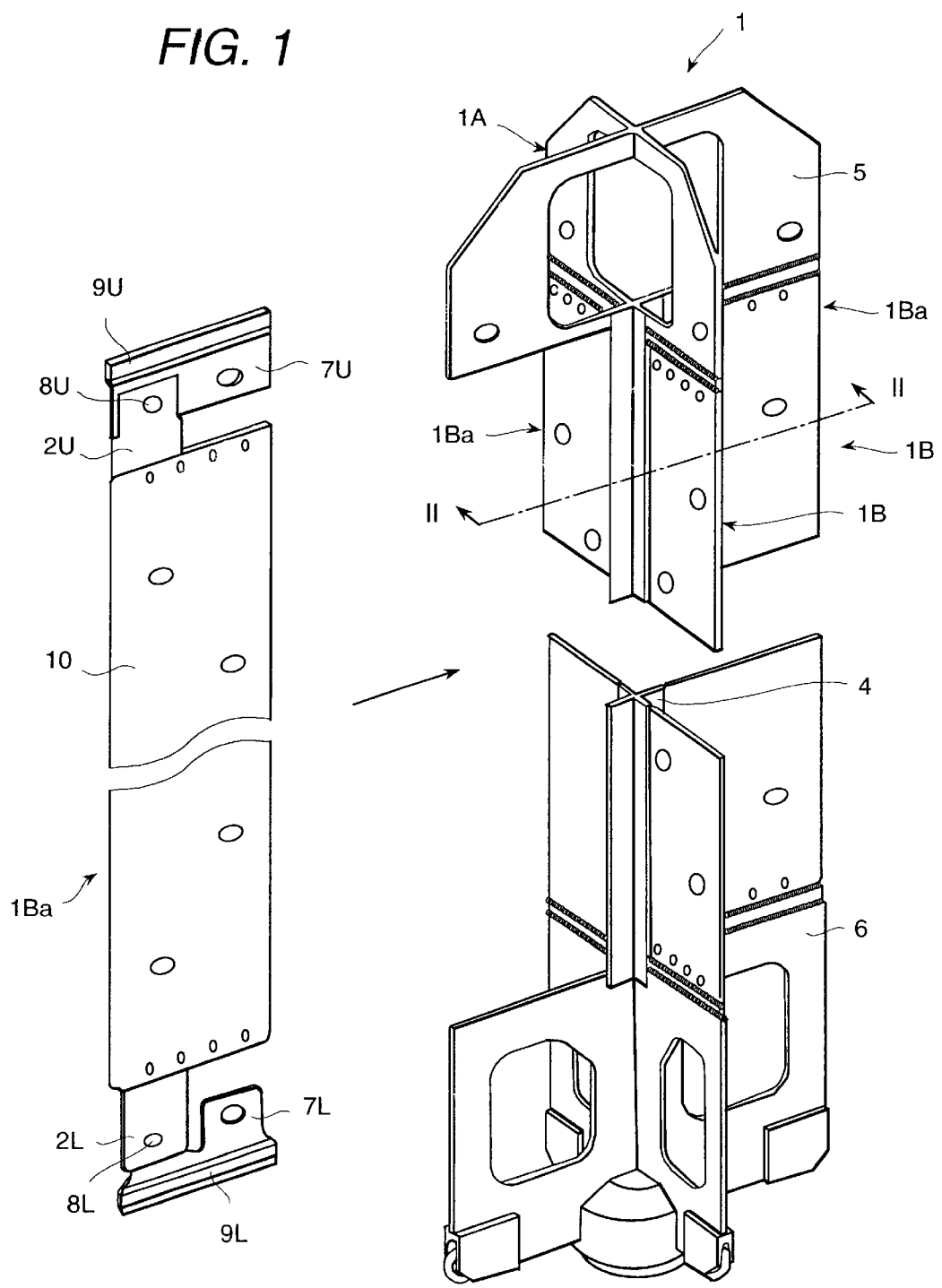
FIG. 1 is a partially broken perspective view of a whole construction of a control rod of an embodiment of the present invention.

Hereunder, an embodiment of the present invention will be described, referring to the drawings.

Control rods according to the present embodiment are arranged in a control cell of a BWR core and inserted in the core for adjusting output during reactor operation, and use tubes of hafnium as reactivity control material.

Figure 2:
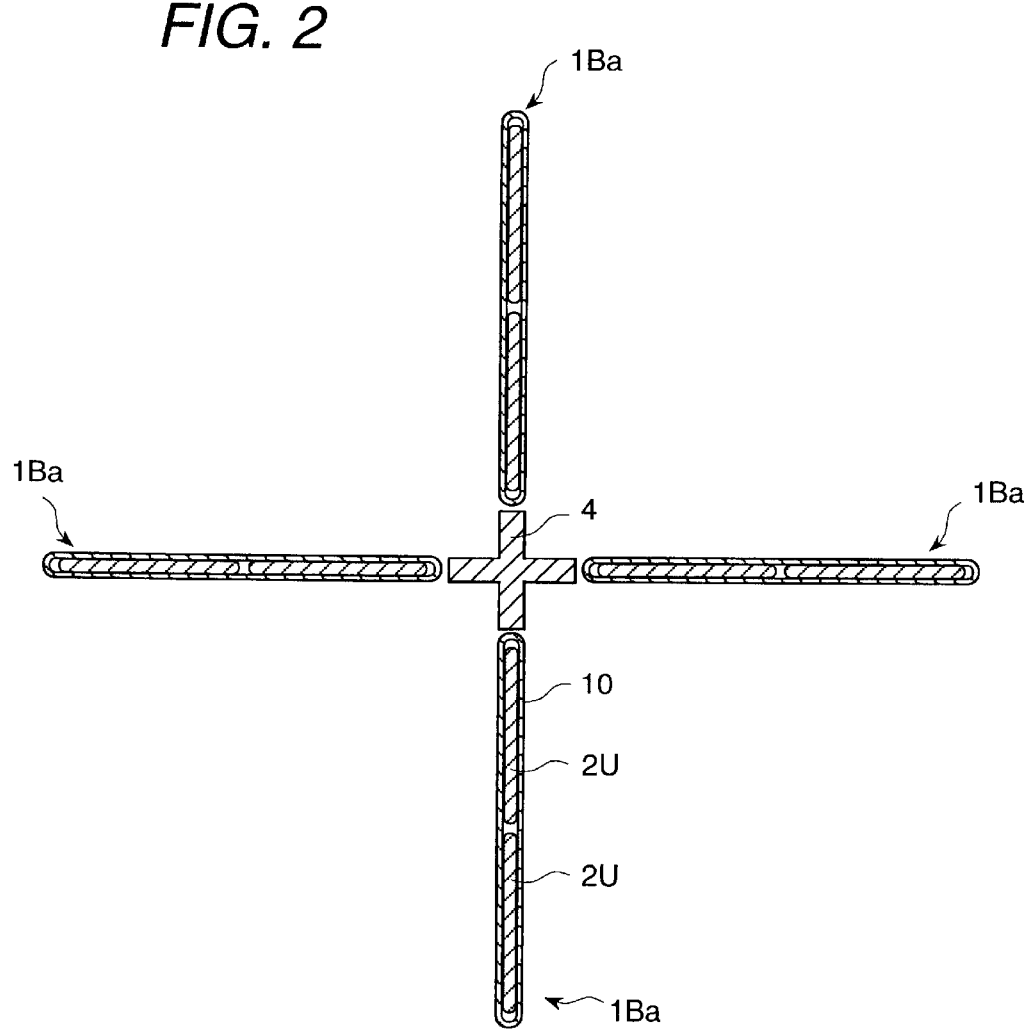
FIG. 2 is a cross-sectional view taken along the line II—II of FIG. 1.

FIG. 1 is a perspective view showing the whole construction, in which a part is disassembled, of a control rod of an embodiment of the present invention, and FIG. 2 is a cross-sectional view taken along the line II—II of FIG. 1.

In FIGS. 1 and 2, the control rod 1 is approximately cruciform in section and has four blades extending from an axis in four directions. A lower support member 6 (or conventional falling speed limiter, for example, referred to FIG. 5 in JP A 11-94975, hereunder similarly referred) is provided at a lower end portion of the blades, and a handle 5 is provided at an upper end portion.

The control rod 1 is constructed by joining parts (a first unit) 1A and parts (a second unit) 1B. The first unit 1A has a tie rod 4 and the handle 5 and the lower support member 6 each connected to the tie rod 4 and the second unit 1B has sheaths 10 each of which is a tube of substantially straight sections having U-shaped end sections at both lateral ends, made of stainless steel and contains therein reactivity control material, and upper end plates 9U and lower end plates 9L mounted on said sheaths 10.

Hereunder, manufacturing procedures thereof are explained.

First, the first unit 1A is assembled. That is, a lower portion of the handle 5 is welded and fixed to the upper end portion of the tie rod 4, and the lower support member 6 is welded and fixed to a lower end portion of the tie rod 4, whereby they are assembled as a construction of cruciform cross-section.

Four unit components 1Ba forming the second unit 1B each are assembled. That is, an upper end plate 9U has, at a lower portion thereof, a tongue-shaped portion 7U formed in advance in one block to extend downward (the upper end plate and its tongue-shaped portion 7U may be formed in one piece or joined by welding them into one block), the tongue-shaped portion 7U is inserted in an upper hafnium tube 2U of reactivity control material from an upper side thereof and connected to the tube by a fixing pin 8U passing through both the tongue-shaped portion and the tube.

At this time, a lower end plate 91 also has, at an upper side thereof, a tongue-shaped portion 7L formed in advance in one block so as to extend upward, and the tongue-shaped portion 7L is inserted in a lower hafnium tube 2L of reactivity control material from a lower side thereof and connected to the tube by a fixing pin 8L passing through both the tongue-shaped portion and the tube.

The upper and lower hafnium tubes 2U and 2L connected to the upper and lower end plates 9U and 9L by the pins are arranged in the sheaths 10, and lower and upper edge portions of the upper and lower end plates 9U and 9L are welded and fixed to upper and lower edge portions of the sheath 10, respectively (refer to welding lines shown by thick and solid lines in FIG. 1). Thereby, the upper end plate 9U, upper hafnium tubes 2U, sheath 10, lower hafnium tubes 2L and lower end plate 9L are assembled in one block, whereby each unit component 1Ba constructing the second unit 1B is completed.

An upper end portion of the upper end plate 9U of each second unit component 1Ba and a lower end portion of the lower end plate 9L are welded and fixed to an lower end portion of the handle 5 and an upper end portion of the lower support member 6 of the first unit 1A which is an assembly of the handle 5, tie rod 4 and lower support member 6 (refer to welding lines shown by thick and solid lines in FIG. 1). Thereby, the first unit 1A and the second unit 1B composed of four components 1Ba are joined to complete the control rod 1.

Effects of the control rod 1 of the present embodiment constructed as mentioned above will be explained in detail.

(1) Improvement of Productivity By Making the Parts Common

The largest effect of the present embodiment is that the productivity is improved by making common use of the first unit 1A which is an assembly of the handle 5, lower support member 6 and tie rod 4 for different type of control rods.

In order to explain the effect, examples of the other types of control rod which can be used commonly as mentioned above are given.

(1-A) Control rods using $B_4C$-containing neutron absorbing rods

Figure 3:
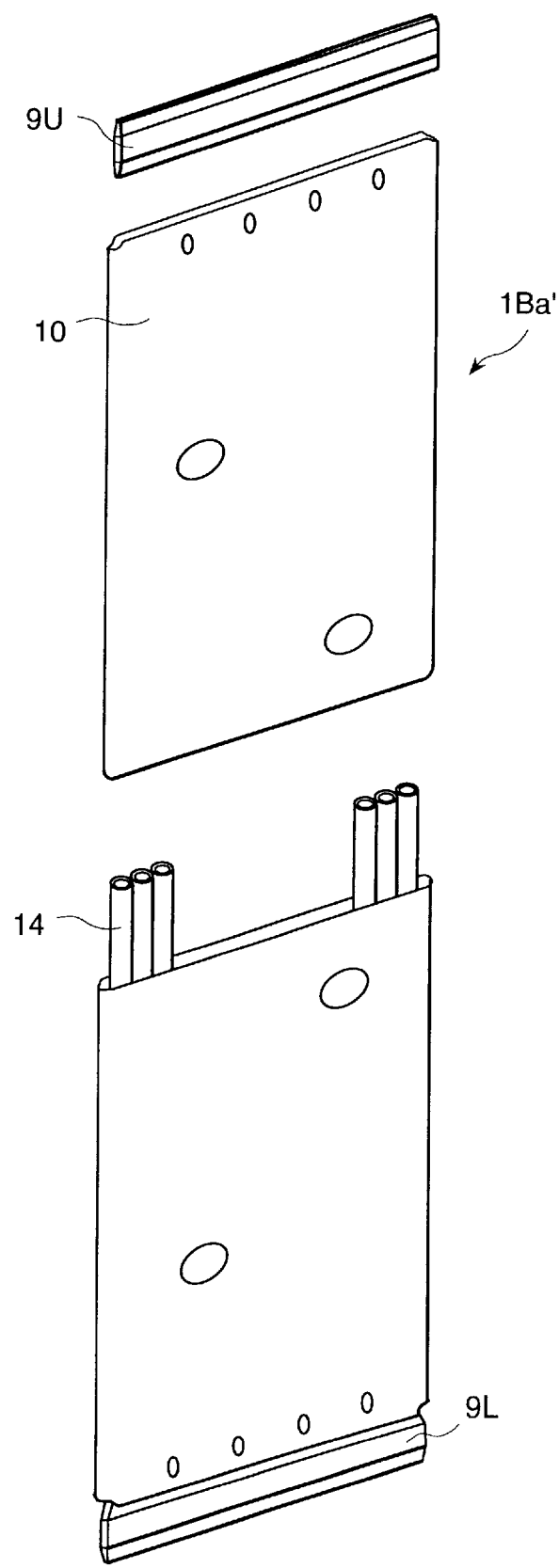
FIG. 3 is a partially broken perspective view of a component 1Ba' of a second unit in a control rod using a $B_4C$-containing neutron absorbing rod.

FIG. 3 is a partially broken perspective view showing a partially disassembled construction of a second unit component 1Ba' in the case where the present invention is applied, to make common, to a control rod of the type in which the $B_4C$-containing neutron absorbing rods are used. The same reference numbers are given parts or portions equivalent to those in FIGS. 1 and 2.

In FIG. 3, the second unit component 1Ba' is for constructing a control rod arranged in a non-control cell of a BWR core and inserted in the core for stopping the nuclear reactor during operation of the nuclear reactor, and neutron absorbing rod 14 that boron carbide ($B_4C$) is filled in a stainless steel cladding, for example is used as a reactivity control material arranged in the sheath In this case, any connecting or fixing construction is not provided between each neutron absorbing rod 14 and the upper end plate 9U on the side of handle 5 and the lower end plate 9L on the side of lower support member 6, and the each neutron absorbing rod 14 is disposed on the lower end plate 9L inside the sheath 10 by the weight of the neutron absorbing rod itself.

(1-B) Control rods using hafnium solid rods

Figure 4:
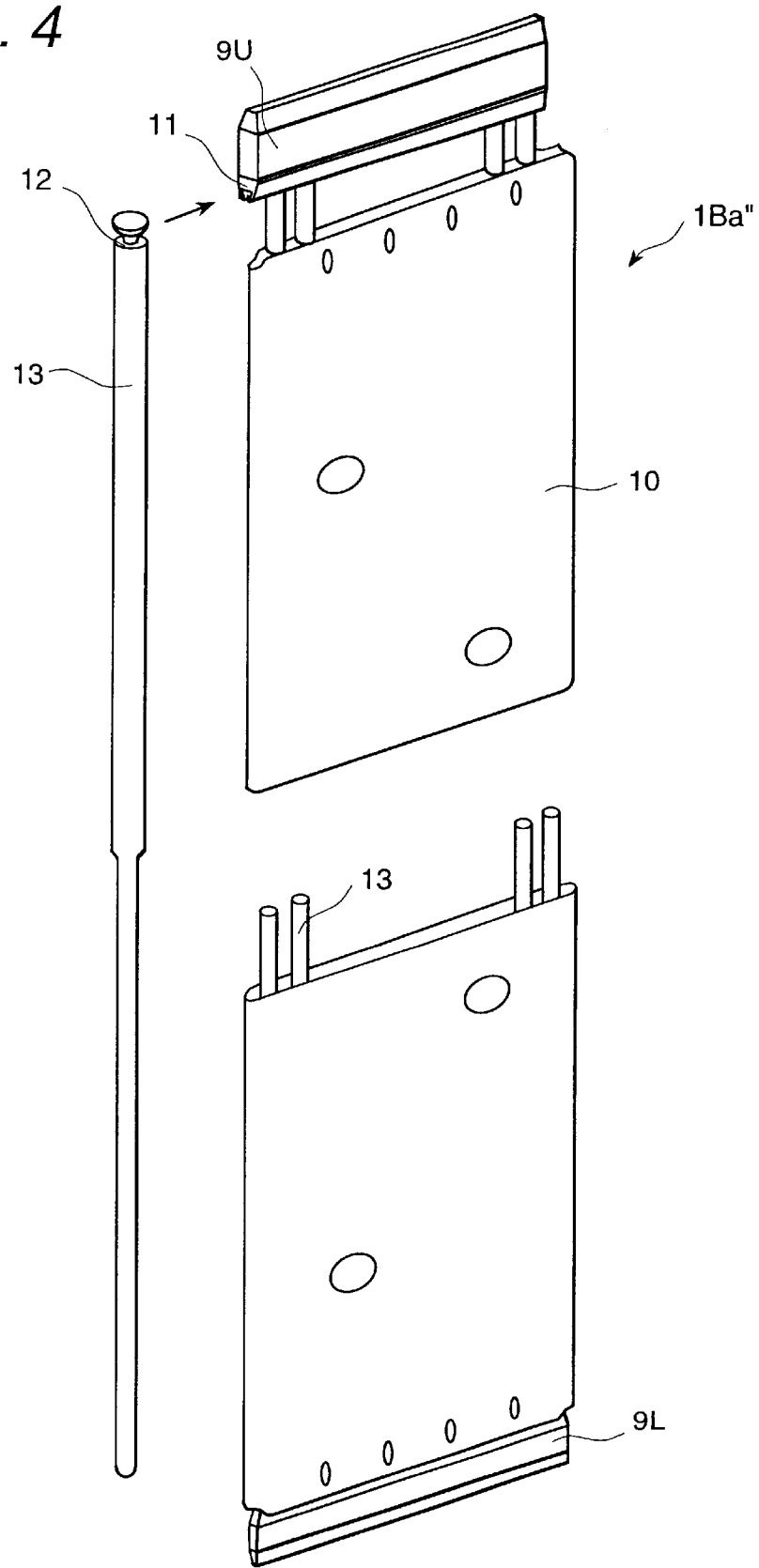
FIG. 4 is a partially broken perspective view of a component 1Ba" of a second unit in a control rod using a hafnium solid rod.

FIG. 4 is a partially broken perspective view showing a partially disassembled construction of a second unit component 1Ba" in the case where the present invention is applied, to make common, to a control rod of the type in which the hafnium solid rods are used. The same reference numbers are given parts or portions equivalent to those in FIGS. 1 to 3.

In FIG. 4, the second unit component 1Ba" is for constructing a control rod arranged in a control cell of a BWR core and inserted in the core for adjusting output during operation of the nuclear reactor, and the hafnium solid rods 13 (circular rods with steps) are used as reactivity control material arranged in the sheath 10.

An convex portion 12 which is shaped in curtain rail is provided at an upper portion of each hafnium rod 13, and the convex portion 12 is inserted in a curtain rail shaped concave portion 11 provided on the upper end plate 9U, whereby the hafnium rod 13 is supported in the sheath 10. In this case, any connecting or joining construction is not used between the each hafnium rod 13 and the lower end plate 9L.

(1-C) Making the first unit common

Here, in the control rod 1 of the present embodiment, previously shown in FIGS. 1 and 2, a lower portion side of the handle 5, on which reactivity control material is mounted in a conventional construction, is separated as the upper end plate 9U to be a separate member, and in the same manner, an upper region of the lower support member 6(or falling speed limiter, hereunder referred in the same manner) is separated as the lower end plate 9L to be a separate member. The handle 5 of which the lower region is separated and the lower support member 6 of which the upper region is separated are mounted on upper and lower portions of the tie rod 4, respectively, thereby to make the first unit 1A, while the sheath 10 containing therein reactivity control material is mounted on the upper end plate 9U separated from the handle 5 and the lower end plate 9L separated from the lower support member 6, as mentioned above, thereby to make the component 1Ba of the second unit 1B.

Thereby, as shown in FIGS. 1 and 2, for the control rod 1 using the upper hafnium elliptic tubes 2U and lower hafnium elliptic tube 2L, the upper and lower tongue portions 7U and 7L are fixed to the upper and lower end plates 9U and 9L, respectively, and the upper and lower hafnium elliptic tubes 2U and 2L are connected to them by the pins 8U and 8L and covered with the sheaths 10, whereby the second unit 1B composed of the components 1Ba for specific use is prepared; for the control rod using the neutron absorbing rods 14 containing therein $B_4C$ as explained in the above item (1-A), the second unit for specific use composed of the components 1Ba' mounting the neutron absorbing rods 14 on the lower end plates 9L as shown in FIG. 3 is prepared; for the control rod using hafnium solid rods 13 as explained in the above item (1-B), the second unit composed of the components 1Ba" for specific use each formed by engaging the curtain rail-shaped concave portion formed at the lower portion of the upper end plate 9U with the convex portion 12 formed at the upper portion of each hafnium rod 13 and covered with the sheath 10 is prepared; whereby the first unit 1A of an assembly of the handle 5, the lower support member 6 and the tie rod 4 can be commonly used for the above-mentioned three types of control rods (having them in common) when the main sizes of the control rod (the whole length of the control rod 1, the whole width of the control rod 1, the thickness of the blade and the length of the upper and lower hafnium 2U and 2L, etc.) is standardized.

Therefore, the process and equipment can be reduced and the productivity can be improved compared with conventional process and equipment in which different process and equipment were necessary for each type of control rods.

Further, it is possible to store the first units 1A which are made common and to store in the same place through the same transportation route. Only the second units 1Ba, 1Ba' and 1Ba" which are different from each other need to be stored in different places, so that there is also such an effect that storage spaces can be reduced without suffering from disadvantages of transportation.

Further, by taking the same main sizes as those of a conventional construction, when the conventional existing control rods are replaced, it is unnecessary to reconstruct other portions (other surrounding members, structures, etc. including a control rod drive mechanism) around the control rods and it has such an effect that a part of conventional production process and equipment of the conventional control rods can be used therefor.

(2) Workability, working efficiency improvement and process simplification in assembling work In conventional construction, a handle, a tie rod and a lower support member are assembled as an assembly of cruciform cross-section, and then upper and lower hafnium tubes are fixed to upper and lower tongue-shaped portions by pins, for all four wings prepared in a curciform shape for the assembly, then the upper and lower hafnium tubes are taken into a U-shaped sheath, then the sheath and the toe rod are welded and fixed and the sheath is welded both to the handle and to the lower support member. The above-mentioned processes were necessary to be taken in the above-mentioned order.

On the contrary, in the control rod 1 according to the present embodiment, independently of a production of the first unit 1A in which the handle 5, the tie rod 4 and the lower support member 6 are assembled as the construction of cruciform cross-section, the following process can be taken for each of the components 1Ba (corresponding to the above-mentioned four wings in cruciform shape) forming the second unit 1B, that is, the upper and lower hafnium tubes 2U and 2L are mounted on the upper and lower tongue-shaped portions 7U and 7L by the pins, then the upper and lower hafnium tubes 2U and 2L are inserted into the sheath 10, and then the sheath 10 and the upper and lower end plates 9U and 9L are welded and fixed to each other.

As mentioned above, since it is possible to produce the first unit 1A and the four second unit components 1Ba independently of each other, and finally, weld and fix, in a lump, the upper and lower end plates 9U and 9L of each second unit component 1Ba to the lower portion of the handle 5 and the upper portion of the lower support plate 6 of the first unit 1A, it is easy to handle the assembling parts and it is possible to improve greatly the workability and working efficiency of the assembling work.

Further, in the control rod 1 according the present embodiment as described above, the sheath 10 prepared for the second unit 1B is made in a tube. Thereby, it is possible to form a closed space containing therein the reactivity control material by only the sheath, so that it is unnecessary to weld a U-shaped open end of the sheath to a cruciform end surface of a tie rod of cruciform cross-section. That is, it is possible to omit complicated welding of plural positions in the length direction of the tie rod 4 which is long and several meters in length, so that the process can be simplified and the reliability also can be raised as well.

What is claimed is:

1. A control rod for a BWR comprising:
   a first unit comprising a tie rod, a handle mounted on an axially upper portion of said tie rod and a lower support member or falling speed limiter mounted on an axially lower portion of said tie rod; and
   a second unit comprising a sheath containing therein reactivity control material, an upper end plate mounted on an axially upper portion of said sheath and a lower end plate mounted on an axially lower portion of said sheath;
   wherein said first unit and said second unit are joined to each other only at said upper end plate and said lower end plate so that said sheath is not fixed to said tie rod, wherein an upper portion of said upper end plate is fixed to said handle, and a lower portion of said lower end plate is fixed to said lower support member or falling speed limiter;
   whereby said control rod is constructed as a joined body of said first unit and said second unit.

2. A control rod for a BWR according to claim 1, wherein said sheath is made of a hollow tube of substantially straight sections having U-shaped end sections at both lateral ends.

3. A control rod for a BWR according to claims 1 or 2, wherein said reactivity control material is made of at least one of a hafnium tube of substantially straight sections with U-shaped end sections, a hafnium rod and a neutron absorbing rod containing boron carbide.

4. A control rod for a BWR according to claim 1, wherein said sheath is made of a hollow tube of substantially straight sections having U-shaped end sections at both lateral ends, and containing therein reactivity control material;
   an upper end plate mounted on an axially upper portion of said sheath; and a lower end plate mounted on an axially lower portion of said sheath.

5. A control rod for a BWR according to claim 1, wherein said first unit and said second unit are joined so that said sheath is laterally separate from said tie rod.

6. A control rod for a BWR according to claim 1, wherein said sheath is fixed to said handle through welding said sheath to said upper end plate and welding said upper end plate to said handle, and said sheath is fixed to said lower support member through welding said sheath to said lower end plate and welding said lower end plate to said lower support member.

* * * * *